United States Patent

Moschopoulos et al.

(10) Patent No.: US 9,600,207 B2
(45) Date of Patent: Mar. 21, 2017

(54) INTEGRATED CIRCUIT WITH A PATCHING FUNCTION

(71) Applicant: Dialog Semiconductor B.V., 's-Hertogenbosch (NL)

(72) Inventors: Nikolaos Moschopoulos, Athens (GR); Dimitris Chanos, Patras (GR); Ioannis Sifnaios, Athens (GR); Konstantinos Ninos, Athens (GR); Dimitrios Papadopoulos, Patras (GR)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 531 days.

(21) Appl. No.: 14/050,449

(22) Filed: Oct. 10, 2013

(65) Prior Publication Data

US 2014/0281165 A1 Sep. 18, 2014

(30) Foreign Application Priority Data

Mar. 15, 2013 (EP) .................................... 13159438

(51) Int. Cl.
*G06F 3/00* (2006.01)
*G06F 3/06* (2006.01)
*G06F 9/445* (2006.01)
*G06F 9/32* (2006.01)

(52) U.S. Cl.
CPC .......... *G06F 3/0679* (2013.01); *G06F 3/0619* (2013.01); *G06F 3/0629* (2013.01); *G06F 8/66* (2013.01); *G06F 9/328* (2013.01)

(58) Field of Classification Search
None
See application file for complete search history.

(56) References Cited

U.S. PATENT DOCUMENTS

| 4,400,798 | A | * | 8/1983 | Francis et al. ................. 365/174 |
| 5,757,690 | A | * | 5/1998 | McMahon ..................... 365/104 |
| 6,260,157 | B1 | * | 7/2001 | Schurecht et al. ........... 714/6.13 |
| 2002/0062479 | A1 | | 5/2002 | Takata |
| 2003/0147369 | A1 | * | 8/2003 | Singh et al. .................. 370/338 |
| 2006/0085686 | A1 | * | 4/2006 | Cheston et al. ................ 714/38 |
| 2010/0106953 | A1 | | 4/2010 | Morad et al. |

FOREIGN PATENT DOCUMENTS

| EP | 13159438.4-1957 | 3/2013 |
| GB | 2348986 | 10/2000 |

OTHER PUBLICATIONS

Wikipedia, Bluetooth low energy, May 6, 2009, pp. 1-4.*
Wikipedia, Flash memory, Mar. 16, 2004, p. 1.*
Wikipedia, Static random access memory, Feb. 17, 2011, pp. 1-5.*

* cited by examiner

*Primary Examiner* — Henry Tsai
*Assistant Examiner* — Dean Phan
(74) *Attorney, Agent, or Firm* — Saile Ackerman LLC; Stephen B. Ackerman

(57) ABSTRACT

An integrated circuit with a patching function comprises a one-time programmable memory (OTP), a random access memory (RAM), and a control unit. The control unit copies data stored on the OTP into the RAM to obtain a copied image mirroring said data. It checks for presence of one or more patch instructions in the OTP, and, if a patch instruction is found in the OTP, modifies a portion of the copied image based on the patch instruction, to obtain a patched image stored in the RAM. The integrated circuit further comprises a processing unit configured to access the patched image in the RAM. The patch can be provided wirelessly.

22 Claims, 7 Drawing Sheets

Max Payload of the BLE packet is 27 octets
PDI (Patch Download Instruction)

PTI (Patch Trail Instruction)

INTEGRATED CIRCUIT WITH A PATCHING FUNCTION

TECHNICAL FIELD

The disclosure relates to an integrated circuit with a patching function. The disclosure further relates to a one-time programmable memory (OTP).

BACKGROUND

The use of one-time-programmable (OTP) memories as non-volatile storage for code in ultra-low power deeply embedded systems has recently been deployed. OTPs have been used for storing a secret key, system configuration parameters, or as bit flags for various operations within a System on Chip (SoC). Lately, new technologies have enabled the use of larger OTP cells (i.e. 64 Kbytes) for storing the firmware of the System-On-Chip (SoC).

A disadvantage of the OTP is that if a certain memory space is programmed, it cannot be programmed again. Thus, if a bug in the firmware exists, the system cannot be upgraded since the OTP cannot be "corrected". Another disadvantage is that OTP has relatively high power dissipation when accessed.

Patches for OTP's may be provided in form of a pre-defined jump table to specify patchable subroutines that contains a list of possibly patchable functions and their start addresses in the OTP memory.

It is a challenge for designers of OTP memories to find a way to correct content of OTPs without requiring pre-defined jump tables.

SUMMARY OF THE INVENTION

It is an object of the invention to patch content of a one-time programmable memory.

It is further an object of the invention to provide a structured way for implementing patches on an existing firmware residing in an OTP memory that is mirrored into a RAM.

In a first aspect, the invention provides an integrated circuit with a patching function, the integrated circuit comprising
  a one-time programmable memory "OTP";
  a random access memory "RAM";
  a control unit arranged for:
  copying data stored on the OTP into the RAM to obtain a copied image mirroring said data;
  checking for presence of a patch instruction in the OTP, and if a patch instruction is found in the OTP, modifying a portion of the copied image based on the patch instruction, to obtain a patched image stored in the RAM.

This allows an OTP to be patched in a highly flexible way. The patch instruction can be any instruction to modify the copied image in the RAM. After the patching, the patched image can be handled in the same way as an unpatched image. The patch instruction can be used to patch any portion of the data stored on the OTP. There is no need to pre-populate a list of patchable functions. As the data is copied and patched into RAM, it can be accessed thereafter from the RAM, avoiding power dissipation caused by continuous access of OTP.

The integrated circuit may further comprise a processing unit. Such a processing unit may be configured to access the patched image in the RAM. For example, the integrated circuit is a system-on-a-chip, integrating the processing unit, OTP, memory, and the control unit. It will be understood that the control unit may, for example, be implemented by using the processing unit.

For example, the data stored on the OTP may comprise an executable program code. The patch instruction may comprise a software patch to update the executable program code so as to obtain updated program code. This way, the executable program may be conveniently updated.

The processing unit may be arranged for executing the updated executable program code stored in the patched image in the RAM. This is a suitable way to update, for example, a system-on-a chip or an otherwise integrated system comprising memory and processor.

The control unit may be configured to copy the data from a predetermined first address range of the OTP, and check the presence of patches in a predetermined second address range of the OTP, wherein the first address range is different from the second address range. This way, patches can be programmed on the same OTP that contains the data. Therefore, no additional memory is needed to store the patch instruction. Moreover, as the memory is one time programmable only, the patch cannot overwrite the original data directly but is better stored in a separate memory range.

The OTP may have memory addresses in an OTP address range covering addresses from a lowest OTP address to a highest OTP address. The predetermined first address range may be located at or near one end of the OTP address range, while the predetermined second address range may be located at or near the other end of the OTP address range. This makes it easy to check for the presence of patch instructions, starting from the other end of the OTP address range.

The integrated circuit may comprise a communication unit for receiving an external signal representing a patch of the data stored on the OTP. The control unit may be arranged for storing subsequently received patches onto contiguous memory locations of the OTP. This way, the patches are stored systematically on the OTP, allowing as many patches as possible to be placed on the OTP, and making it easy to check for the presence of patch instructions.

The patch instruction may comprise a patch address and a patch data block. The patch address may be indicative of an address within the copied image. The control unit may be arranged for overwriting a portion of the copied image with the patch data block, based on the address. This allows any portion of the data stored on the OTP to be replaced by data indicated by the patch instruction. For example, the patch address may indicate an address within the copied image by reference to an address of the OTP that falls within the data stored on the OTP. Such an address has a clear corresponding address in the copied image.

The patch instruction may comprise a patch address, an indication of a word size, and a word value in accordance with the word size. The patch address may be indicative of an address within the copied image, and the control unit may be arranged for overwriting a word of the copied image with the word value based on the patch address. Herein, the word of the copied image may have a size corresponding to the word size of the patch instruction. This is useful for making minor changes involving a change of a single word (or just a few words) of a particular word size.

In another aspect, the invention provides a one-time programmable memory "OTP" comprising
  data comprising an application code and/or an application data; and at least one patch instruction stored outside an address range of the OTP comprising the data, wherein the patch instruction comprises a patch address and a patch data block, wherein the patch address is indicative of an address within the address range of the OTP comprising the data, and wherein the patch data block is indicative of data that replaces a portion of the data comprising the application code and/or the application data, based on the patch address.

In another aspect, the invention provides a method of patching an OTP, comprising copying data stored on a one-time programmable memory "OTP" into a random access memory "RAM" to obtain a copied image mirroring said data;

checking for presence of a patch instruction in the OTP, and if a patch instruction is found in the OTP, modifying a portion of the copied image based on the patch instruction, to obtain a patched image stored in the RAM.

In another aspect, the invention provides a computer program product comprising instructions for causing a processing unit to perform the method of claim 11.

The person skilled in the art will understand that the features described above may be combined in any way deemed useful. Moreover, modifications and variations described in respect of the integrated circuit may likewise be applied to the one-time programmable memory, the method, and to the computer program product, and modifications and variations described in respect of the method may likewise be applied to the integrated circuit, the one-time programmable memory, and to the computer program product.

BRIEF DESCRIPTION OF THE DRAWINGS

In the following, aspects of the invention will be elucidated by means of examples, with reference to the drawings. The drawings are diagrammatic and may not be drawn to scale. Throughout the figures, the same reference numerals are used to illustrate similar items.

DESCRIPTION

The techniques disclosed herein may be used, for example, to provide a structured way for implementing patches on an existing firmware residing in an OTP memory that is mirrored into a RAM. The OTP may have a memory layout that is predefined, so that the original data and the patches can be distinguished. For example, predetermined patch areas with specific headers may be provided to identify patch instructions. The program code that processes the patch instructions may be stored in any kind of Non-Volatile (NV) memory, such as a separate read-only memory (ROM), another OTP, or on the same OTP on which the data and the patches are stored.

The patches may be used, for example, to correct bugs in the firmware within a One Time Programmable (OTP) memory. Also, firmware of a product that is already deployed in the field may be patched using the techniques described herein. Moreover, the need for a pre-defined jump table to specify patchable subroutines may be avoided.

The techniques disclosed herein may be implemented, for example, on a system-on-a-chip (SoC) that contains a central processing unit (CPU), optionally a non-volatile memory such as a ROM, a RAM, and an OTP. The OTP may be used to store an application program (code) of the SoC. For example, the OTP contents are read and copied into the RAM before starting execution of the program. The reason for this may be that executing from RAM dissipates substantially less power than accessing the OTP for this purpose.

The OTP may comprise a certain space for the application code and a certain space for the patch instruction(s). The software code that handles the patching may be stored on the OTP or on another non-volatile memory. This software code may be callable by the application code. Alternatively, the patching software executes once at startup of the SoC.

The OTP patching scheme may address the problem of being able to change certain parts of the code or specific values of the code variables after the OTP has been programmed. This may be useful, for example, in case a bug or enhancement is identified as necessary and important.

Figure 1:
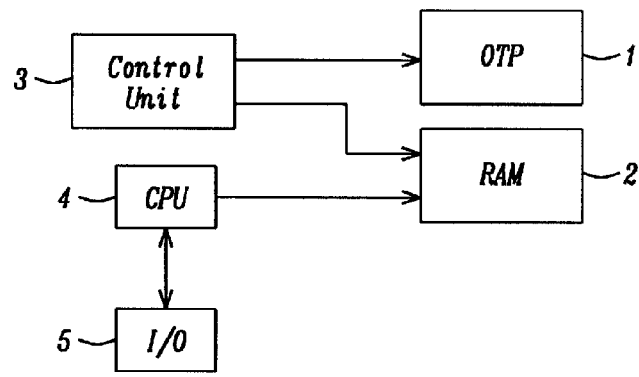
FIG. 1 illustrates elements of a system for handling patches of an OTP.

FIG. 1 illustrates elements of a system that can be used to handle patches of an OTP. In particular, the figure shows an OTP 1, a RAM 2, a control unit 3, a CPU 4, and a communications unit or I/O unit 5. These elements may be implemented on a system-on-a-chip (SoC). However, this is not a limitation, as the elements may also be implemented on separate devices, for example. The control unit 3 and the CPU 4 may be combined in a single unit. For example, the functionality of the control unit 3 may be implemented by a suitably programmed CPU. The system further comprises an OTP 1 and a RAM 2. The control unit 3 may be configured to copy at least part of the contents of the OTP, for example an application or a dataset, to the RAM 2. The CPU 4 may be configured to execute the application that was copied from the OTP 1 onto the RAM 2. The control unit 3 may be arranged for copying data 401 stored on the OTP 1 into the RAM 2 to obtain a copied image mirroring said data 401. The CPU 4 may use this copied image instead of the data from the OTP, for example to reduce power consumption. The control unit 3 may further be configured to check for presence of a patch instruction 402 in the OTP 1. If the control unit 3 finds a patch instruction 402 in the OTP 1, the control unit may be configured to modify a portion 406 of the copied image based on the patch instruction 402, to obtain a patched image 405 stored in the RAM 2. For example, the control unit 3 may be configured to check for patches immediately after copying the data onto the RAM. Alternatively, this may be performed later upon receipt of a specific instruction. For example, the control unit may be configured to perform its copying and patching operations on startup of the system, for example after a reboot or power-on.

For example, the data 401 stored on the OTP 1 may comprise an executable program code and the patch instruction 402 may comprise a software patch to update the executable program code so as to obtain updated program code. The processing unit 4 may be arranged for executing the updated executable program code stored in the patched image 405 in the RAM 2.

The system may comprise a communication unit 5 for receiving an external signal representing a patch of the data 401 stored on the OTP 1. The control unit 3 may be arranged for storing subsequently received patches onto contiguous memory locations 306, 307 of the OTP.

Figure 2:
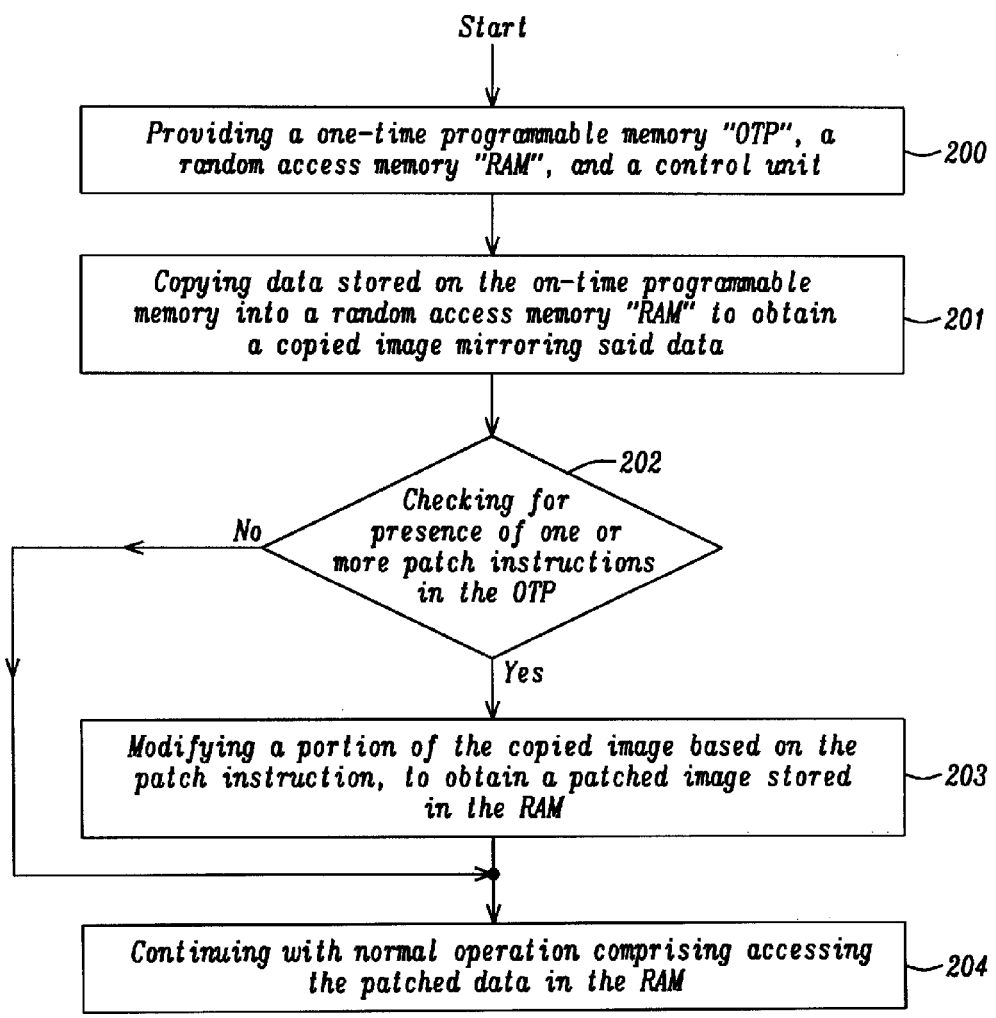
FIG. 2 illustrates a method of handling patches of an OTP.

FIG. 2 illustrates a method of patching an OTP. A first step 200 of the method comprises providing a one-time programmable memory "OTP", a random access memory "RAM", and a control unit. The method further comprises step 201 of copying data stored on a one-time programmable memory "OTP" into a random access memory "RAM" to obtain a copied image mirroring said data. After that, the method proceeds with step 202 of checking for presence of one or more patch instructions in the OTP, and if a patch instruction is found in the OTP, the process proceeds to step 203 of modifying a portion of the copied image based on the patch instruction, to obtain a patched image stored in the RAM. If no patch instruction is found in step 202, or after processing the patch instruction, or patch instructions, in step 203, the process may continue at step 204 with normal operation tasks, comprising accessing the patched data in the RAM. The methods described in this disclosure may be implemented as a computer program product comprising instructions for causing a processing unit to perform the method. The program may be stored on a non-transitive computer readable media. Alternatively, the method may be implemented using dedicated electronic circuitry.

Figure 3:
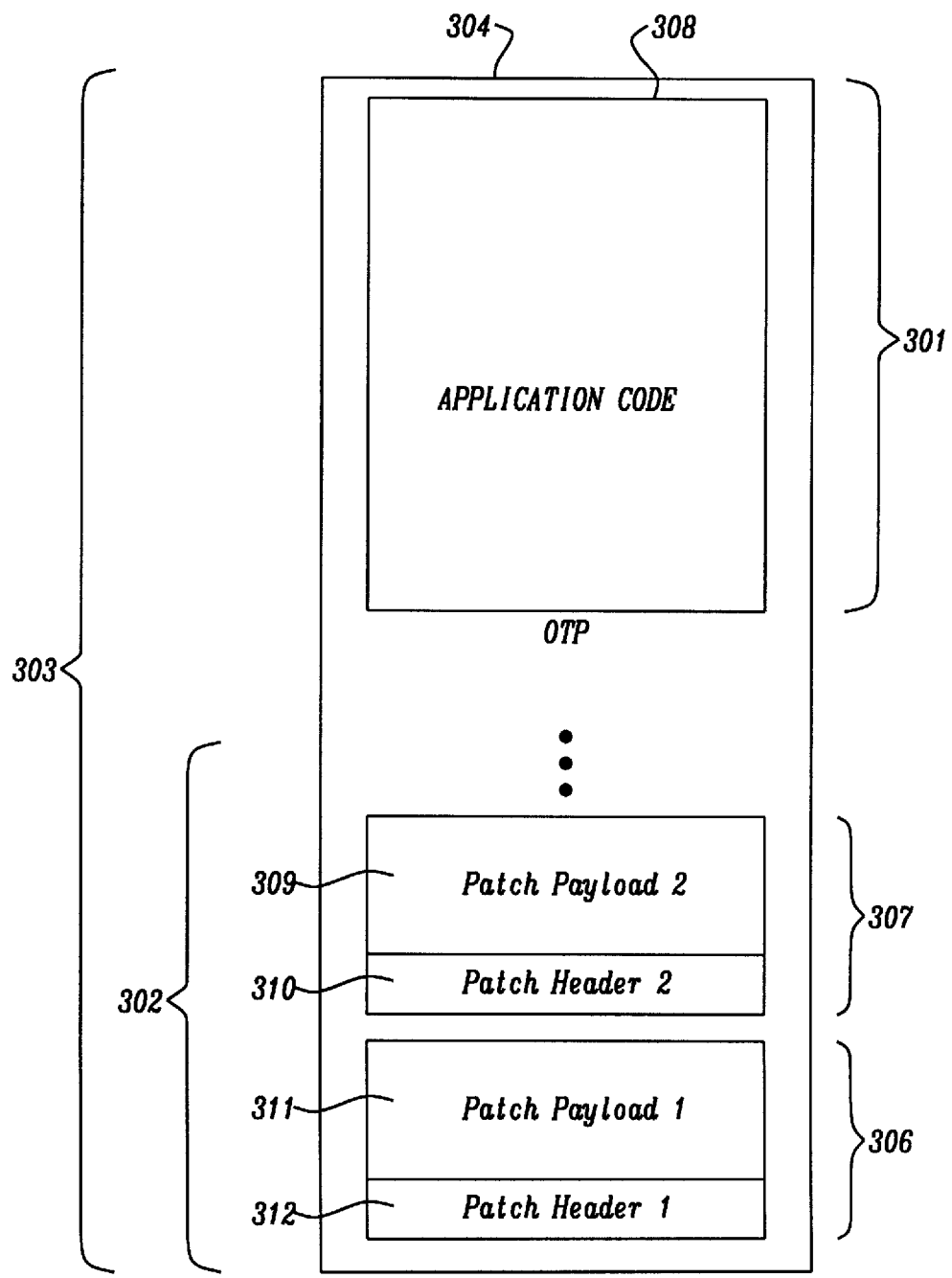
FIG. 3 illustrates a possible OTP memory layout.

FIG. 3 illustrates a one-time programmable memory "OTP" 1. The OTP comprises an address range 301 with data 308 comprising an application code and/or an application data. The OTP further comprises at least one patch instruction. In the example of the figure, two patch instructions 306 and 307 are present. The patch instructions 306 and 307 are stored outside the address range 301 of the OTP 1 comprising the data 308. The patch instructions 306, 307 comprise a patch address, for example in a patch header 312, 310, and a patch data 311, 309, wherein the patch address is indicative of an address within the address range 301 of the OTP 1 comprising the original data 308, 401. The patch data 311, 309 is indicative of data that replaces a portion of the data 308 comprising the application code and/or the application data, based on the patch address.

FIG. 3 illustrates a specific example of how the contents of an OTP may be arranged. However, the details of this example are not intended to limit the scope of the invention. The application code or other user data 308 is stored in a region 301 of the OTP. A patch area 302 may contain patch instructions 306, 307. These patch instructions specify changes that are performed on the user data 301. For example, the patch area 302 may comprise one or more patch instructions 306, 307. Each patch instruction 306, 307 may have its own header 310, 312. Each patch instruction may have its own payload 309, 311.

The control unit 3 may be configured to copy the data 308, 401 from a predetermined first address range 301 of the OTP 1, and check for the presence of a patch instruction 402 in a predetermined second address range 302 of the OTP 1, wherein the first address range 301 is different from the second address range 302.

The OTP 1 may have memory addresses in an OTP address range 303 covering addresses from a lowest OTP address 304 to a highest OTP address 305. The lowest OTP address is typically 0x0. The predetermined first address range 301 may be located at or near one end of the OTP address range 303 and the predetermined second address range 302 may be located at or near the other end of the OTP address range 303. For example, the data 301 may be located at or near address 0x0, while the patch instructions may be located near the highest memory address of the OTP. Alternatively, the data 301 may be located at or near the highest memory address of the OTP, while the patch instructions may be located near address 0x0. However, other arrangements are also possible.

Figure 4:
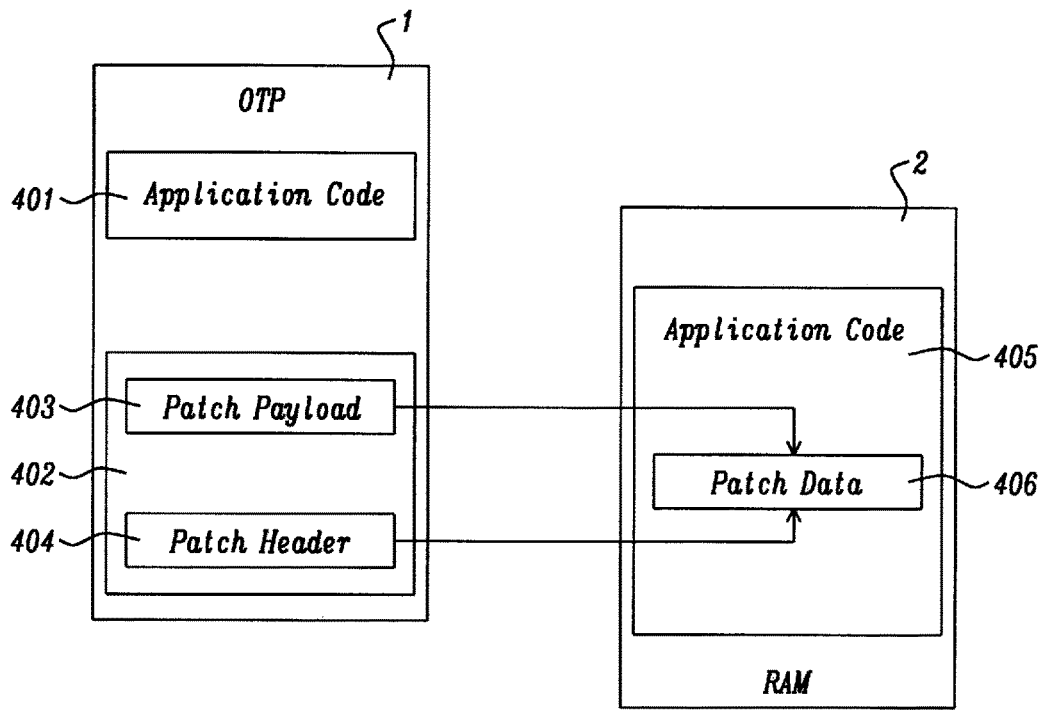
FIG. 4 illustrates a patching process.

FIG. 4 illustrates the OTP 1 and the RAM 2. After power-up and after the data 401 stored on the OTP 1 has been copied into the RAM 2, which may be an SRAM or any other kind of RAM, a patch function may be executed. Depending on the implementation, this patch function may also be executed some time after the data 401 has been copied into the RAM 2. For example, the patch function may be called Patch( ) in an actual implementation. This patch function may reside in the OTP or another non-volatile memory.

For example, the patch function checks a predetermined address for the presence of a patch instruction. For example, the patch function checks the highest OTP address, in case the patch instructions are located at the highest OTP address. However, other arrangements are possible, as long as the patch function knows where to check for the presence of the patch instruction. The patch function can detect a patch function, because the OTP may have a fixed value at addresses that have not yet been programmed. If the value of a memory location has a different value, it has been programmed. As the patch function knows where the patch instructions will be stored, the patch function only has to check whether that memory location has already been programmed. For example, the OTP has values 0 in all memory locations, until the memory locations are programmed. The patch function then can check whether the predetermined address, where the first patch would be stored, is different from 0.

If no patch instruction is found, then the patch function terminates, and normal operation of the system continues, for example, the booting of the system is completed and/or the CPU executes a program from the copied image.

If a patch instruction is found, the patch function may start processing the patch instruction. This may involve reading one or more data fields and modifying a part of the copied image based on the contents of these data fields.

After processing a patch instruction, the patch function may proceed to check for the presence of a further patch instruction in the OTP. A predetermined rule may determine where to check for the next patch instruction. For example a patch instruction may be stored adjacent its preceding patch instruction. If a further patch instruction is found, the patch function may start processing the patch instruction as described above, similar to the first patch instruction.

If no further patch instruction is found, then the patch function terminates, and normal operation of the system continues, for example, the booting of the system is completed and/or the CPU executes a program from the copied image.

Several types of patch instruction will be discussed in more detail hereinafter. However, the skilled person will be able to design other formats of patch instructions using his common general knowledge, in view of the present disclosure. The first patch instruction to be discussed is the 'block' patch type. This type copies a data block, for example to replace the code of a whole function. The second patch instruction to be discussed is the 'word' patch type. This type changes individually addressed bytes/words. This can be used for example to overwrite variable values.

Figure 5:
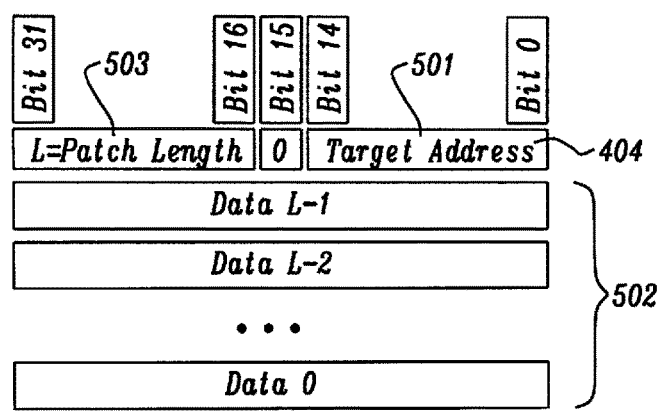
FIG. 5 illustrates a patch instruction of the 'block' patch type.

As a specific non-limiting example, the different types of the patching may be distinguished in a 32-bit architecture by the first word of the header, for example bit 15 thereof. If bit 15=0 then the "block" type patch may be meant, for example. This is shown in FIG. 5. If bit 15=1 then "word" type patch may be meant. This is shown in FIG. 6.

FIG. 5 illustrates a patch instruction of the 'block' patch type. For example, the patch instruction 402 may comprise a header 404 containing a patch address 501. The header may also comprise a patch length 503. The patch instruction may further comprise a patch data block 502. For example, the length of this data block 502 is determined by the patch length 503. The patch function may parse these fields. The patch address 501 may be indicative of an address within the copied image in the RAM. For example, the patch address 501 points to an address within the data 401 stored on the OTP. The patch function may determine a corresponding address on the RAM, where that data 401 has been stored. For example, the address in the RAM is the same as the address in the OTP, or differs by an offset. The patch function may overwrite the corresponding portion 406 of the copied image with the patch data block 502, based on the address.

Figure 6:
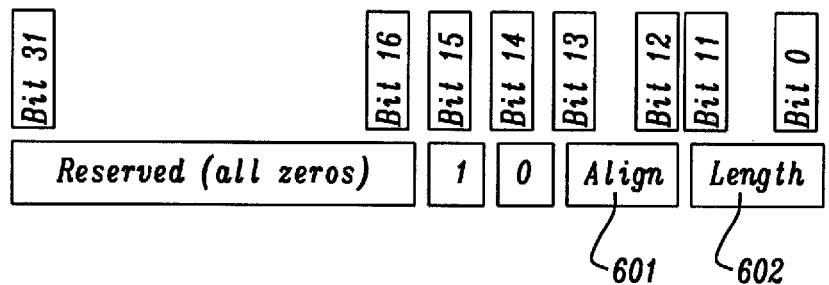
FIG. 6 illustrates an example structure of the header 404 of a "word" type patch instruction.
Figure 7:
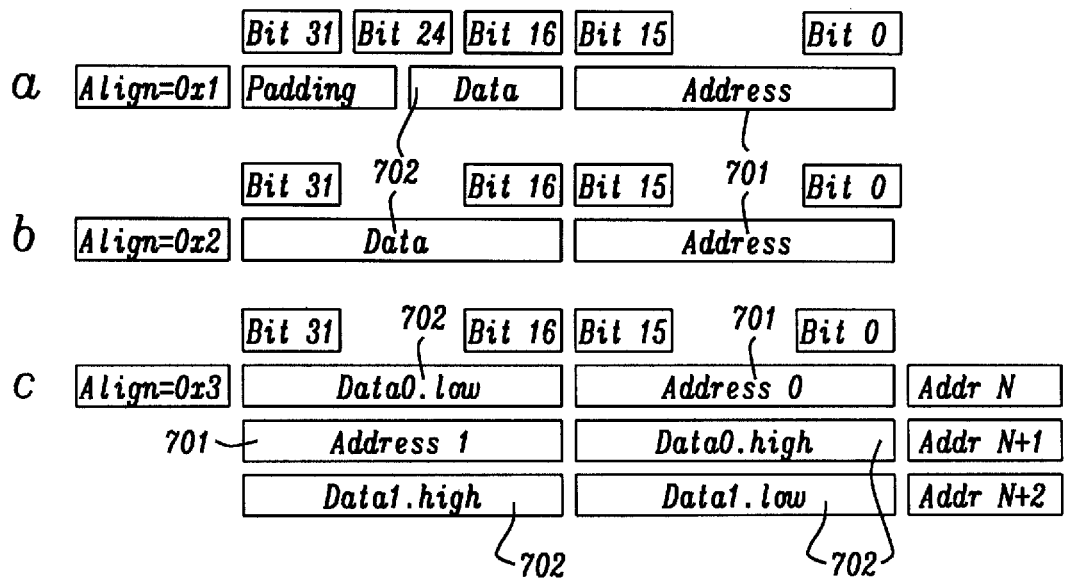
FIG. 7 illustrates several examples of a payload of a "word" type patch instruction.

In FIGS. 6 and 7, the "word" patch type is illustrated. FIG. 6 illustrates an example structure of the header 404 of a "word" type patch instruction, and FIG. 7 illustrates several examples of the payload 403 of such a patch instruction. In this example, the header 404 of the patch instruction 402 may comprise an indication of a word size 601 (referred to hereinafter as "align". For example, align=0x1 means 8-bit, align=0x2 means 16-bit, and align=0x3 means 32-bit. However, this is not a limitation) to indicate the word size and/or a length 602 to indicate how many patches are to be performed by this patch instruction. The payload 403 may contain a number of patches that corresponds to this indicated length 602. Each patch may comprise a patch address 701 and a replacement word 702. The size of the replacement word 702 depends on the word size 601. Three examples are shown in FIG. 7. FIG. 7(a) shows 8-bit word size. FIG. 7(b) shows 16-bit word size. FIG. 7(c) shows 32-bit word size. The payload may contain a word value 702 in accordance with the word size 601, wherein the patch address 701 is indicative of an address within the copied image, and wherein the control unit 3 is arranged for overwriting a word of the copied image with the word value 702 based on the patch address 701, wherein the word of the copied image has a size corresponding to the word size 601 of the patch instruction 402.

As shown in FIG. 7(c), in case of a 32-bit word, the address may also be expressed in 32 bits. The address bits may be divided over several memory words, as shown in FIG. 7(c). However, this is only an example. Any number of bits may be used for addresses and word sizes according to the hardware used.

The aforementioned "word" patch type may be configured to replace the contents in the specific "Address" with the "Data". The number of the replacements is defined by the "Length" field at the header.

Figure 8:
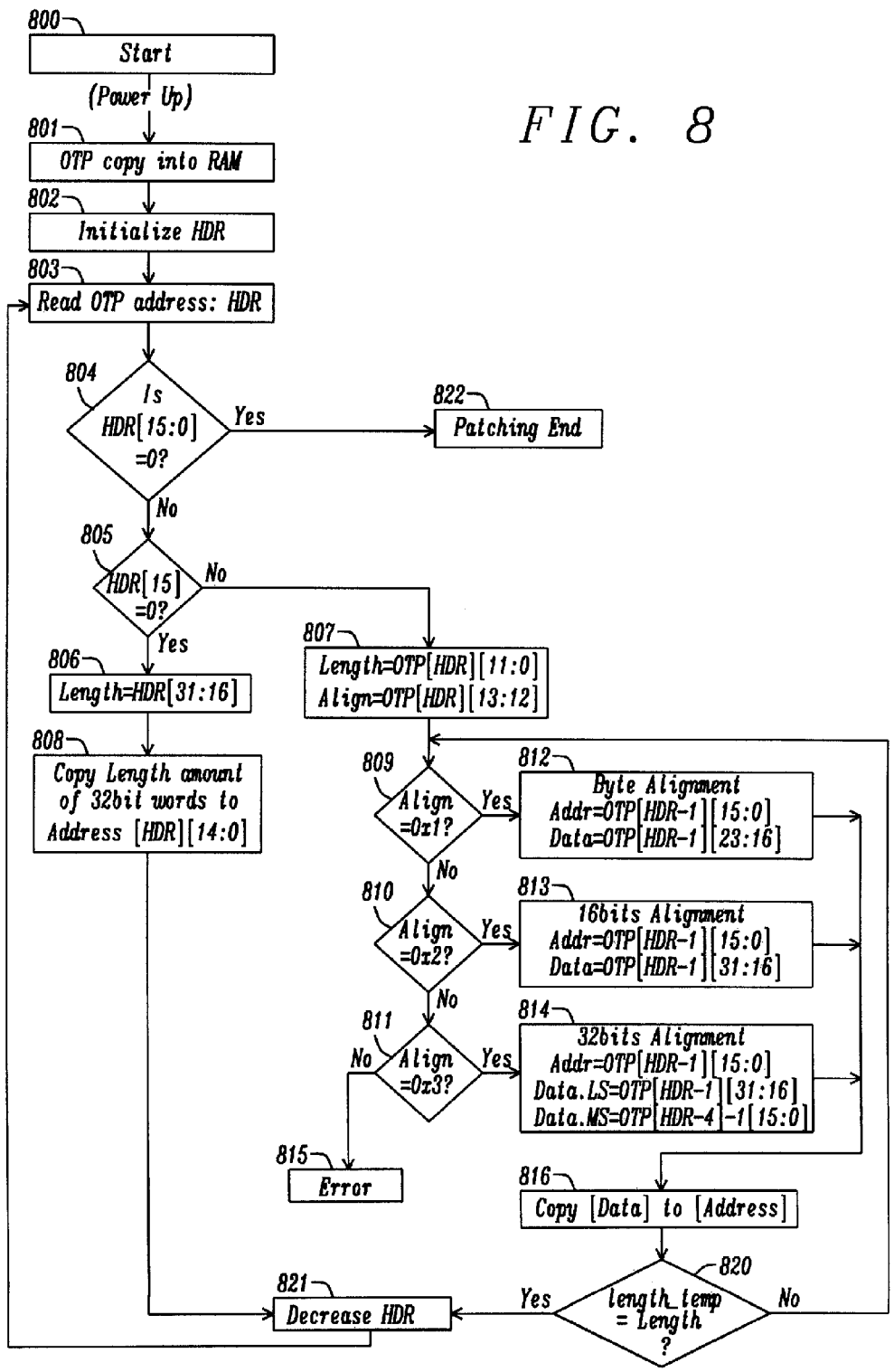
FIG. 8 illustrates a detailed flow diagram of an implementation example that shows how the patching may be applied.

FIG. 8 illustrates a detailed flow diagram of an implementation example that illustrates how the patching may be applied. In step 800 the process starts, for example triggered by a power-up of the system. In step 801, the application data stored on the OTP is copied into the RAM. In step 802 a variable HDR is initialized to the highest OTP memory address (insofar applicable for patches), or to a predetermined value where the first patch would be stored. In step 803, the address HDR is read. If the $0^{th}$ to $15^{th}$ bits of this memory address equals zero at 804, the patching process ends at step 822, and further boot-up functions are performed and/or normal operation continues. If the $0^{th}$ to $15^{th}$ bit of this memory address are not all equal to zero at 804, a patch is applied. At step 805, if $15^{th}$ bit (the patch type indicator bit) is zero, a length of the block is extracted from bits 16 to 31 and a destination address is extracted from bits 0 to 14 at step 806 and the block having such a length is copied to the designated address in step 808. In step 821 variables HDR is decreased by the Length, and process continues at step 803.

If the $15^{th}$ bit of memory address HDR is nonzero at step 805, Length and Align values are extracted at step 807. If Align=0x1 in step 809, 8-bit byte alignment is performed at step 812. If Align=0x2 in step 810, 16-bits alignment is performed at step 813. If Align=0x3 at step 811, 32-bits alignment is performed in step 814. In these alignment steps, the target address and the data to be copied are determined. If no proper alignment value is found in step 811, an error is signaled in step 815. In step 816, the data is copied to the address. At step 820 it is determined if all patches of the patch instruction have been processed based on the number of patches, Length, and the next patch is processed from step 809 if not yet all patches of the patch instruction have been processed. If at step 820 all patches of the patch instruction have been processed, HDR is decreased by the number of words of the patch instruction in step 821, and the process continues at step 803 to check for the presence of a further patch instruction.

The details of the above example are merely for illustrative purposes. For example, the patch instructions could also be arranged in increasing memory addresses. Moreover, the Align values and specific bit arrangements can all be changed.

Some or all aspects of the invention may be suitable for being implemented in form of software, in particular a computer program product. Such computer program product may comprise a storage media on which the software is stored.

Such a storage media may comprise, for example, an optical disc, magnetic disk, or flash memory. Also, the computer program may be represented by a signal, such as an optic signal or an electro-magnetic signal, carried by a transmission medium such as an optic fiber cable or the air. The computer program may partly or entirely have the form of source code, object code, or pseudo code, suitable for being executed by a computer system. For example, the code may be directly executable by one or more processors. Alternatively, the code may be interpreted by an interpreter that is executed by one or more processors. It will be understood that portions of the systems described herein may be implemented in form of software. Moreover, the method steps described herein may be implemented partially or completely in software. The software may be organized by means of subroutines. The subroutines may be combined to form a standalone executable program. Alternatively, the subroutines may be organized as a dynamically linkable library. A main program executable file may be provided that uses the subroutines from the dynamically linkable library. Each of the processing steps and/or system components described herein may be represented by executable code, be it in a dynamically linked library or in an executable file. Some, or all, of the functionality may be implemented as part of an operating system, some functionality may be implemented in a dynamically linked library, and some functionality may be implemented as an application program file. The examples and embodiments described herein serve to illustrate rather than limit the invention. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single hardware or software item combining the features of the items described.

A further embodiment of the disclosure enables a wireless patch of an OTP or ROM image, i.e. without OTP programming. In a first option of this embodiment contains an external non-volatile memory, e.g. $E^2$ PROM or FLASH memory) to store the patches provided that a Deep Sleep mode of the chip is activated to achieve minimal power dissipation. A second option does not contain an external non-volatile memory to store patches but contains Retention RAM. A flag in the OTP may signify which option is actually used.

Figure 9:
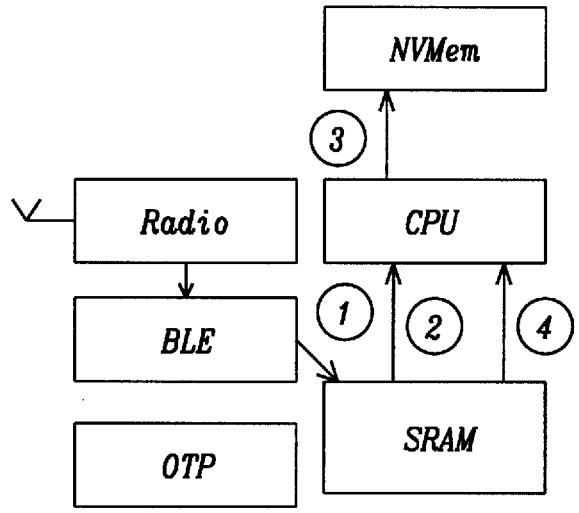
FIG. 9 shows an overview how the wireless patching works.

FIG. 9 shows an overview how the wireless patching works. The flowchart of FIG. 12 illustrates correspondent process steps. After receiving a data packet from a master by a radio antenna, in a first step the received data packet is stored via e.g. a Bluetooth Low Energy (BLE) module into an Exchange Memory, which is an SRAM memory in a preferred embodiment, other types of memory could also be used.

In a second step the CPU parses at application level every packet's payload and identifies a Patch Download Instruction (PDI). In a third step, as soon as a PDI is detected, the next N data packets are being stored into the non-volatile memory (NVMem) after being buffered into the SRAM first, wherein N denotes the total number of payload packets received. In a fourth step, after counting packets at application level, the CPU parses every packet's payload and identifies a Patch Tail instruction (PTI). This ends the patch reception.

After wake up the OTP mirrored application first checks the NVMem header and proceeds then with actual execution. In case the NVMem header has a nonzero entry the CPU calls for the Patch function with the related offset of the address of the first patch.

The NVMem can be for instance an external E2PROM, or Flash, or an on-chip Retention memory.

Figure 10A:
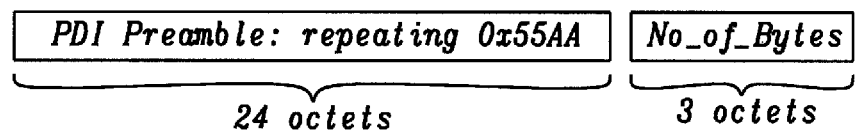
FIG. 10a depicts a Patch download Instruction (PDI).

FIG. 10a depicts a Patch download Instruction (PDI). The PDI comprises e.g. 24 octets comprising a PDI preamble and repeating the Hex format 0x55AA and finally 3 octets describing the number of bytes of the PDI.

Figure 10B:
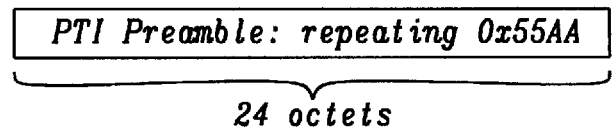
FIG. 10b depicts a Patch Tail Instruction (PTI).

FIG. 10b depicts a Patch Tail Instruction (PTI) comprising e.g. 24 octets comprising a Patch Tail Instruction (PTI) and repeating 0xAA55 data.

Figure 11:
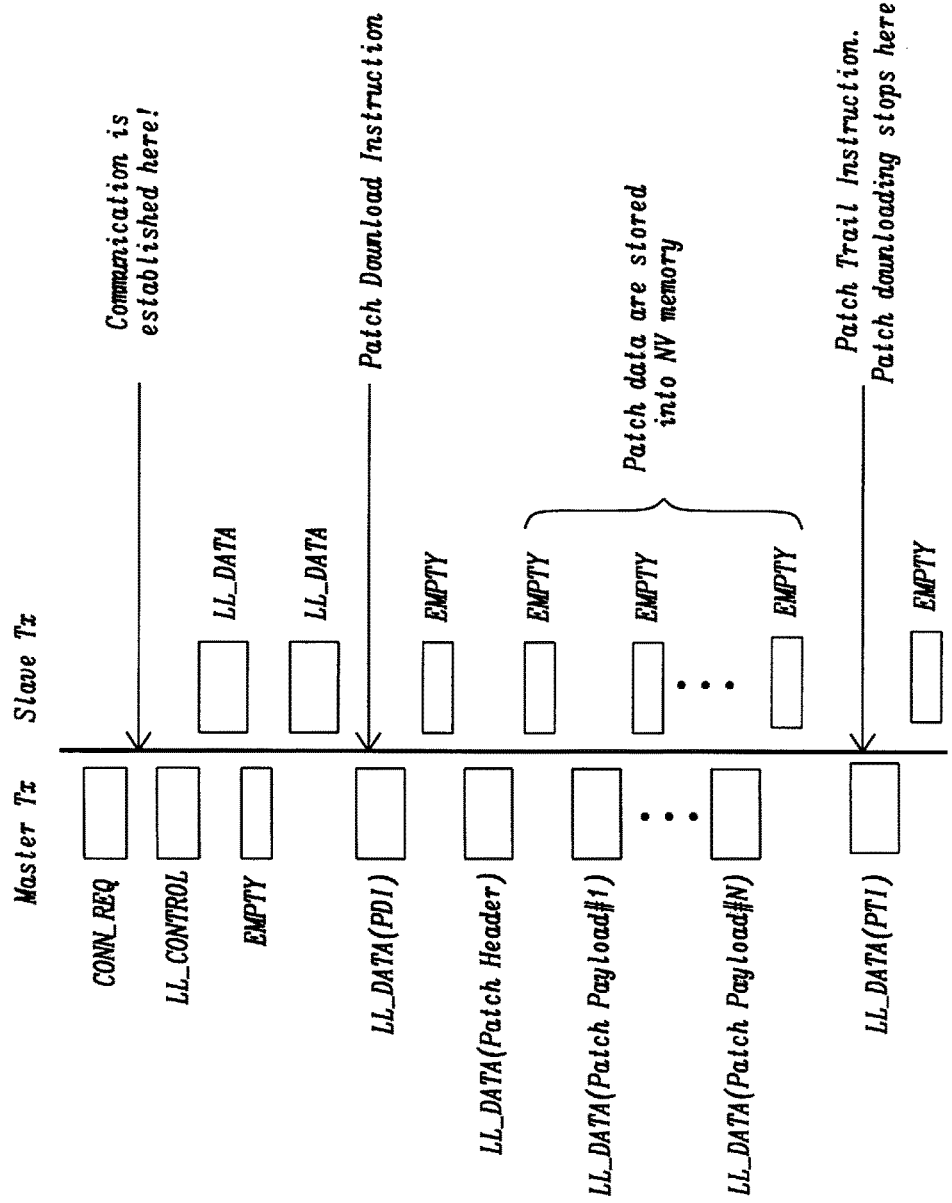
FIG. 11 illustrates an example of the wireless communication to transmit patch of a one-time programmable memory categorized in Master transaction (TX) and Slave transactions (TX).

FIG. 11 illustrates an example of the wireless communication to transmit patch of a one-time programmable memory categorized in Master transaction (TX) and Slave transactions (TX).

The communication starts with a Communication request from the master. After confirmation of the request the link layer (LL) control of the master takes over the communication. Then the Patch header information followed by the payload packets #1 to #N are sent while the slave stores the patch data in the NVMem as described in FIG. 9. After transmitting the N patch data packets the master sends the PTI and the downloading stops.

What is claimed is:

1. An integrated circuit with a patching function, the integrated circuit comprising:
    a one-time programmable memory (OTP);
    a random access memory (RAM);
    a control unit arranged for:
    copying data stored in a predetermined first address range of the OTP into the RAM to obtain a copied image mirroring said data;
    checking for presence of a patch instruction in a predetermined second address range of the OTP, wherein the predetermined first address range is different from the predetermined second address range, wherein the patch instruction specifies a change to be made to the data, and if a patch instruction is found in the predetermined second address range of the OTP, modifying a portion of the copied image based on the patch instruction, to obtain a patched image stored in the RAM,
    wherein the OTP has memory addresses in an OTP address range covering addresses from a lowest OTP address to a highest OTP address, and wherein the predetermined first address range is located at one end of the OTP address range, and wherein the predetermined second address range is located at or near the other end of the OTP address range.

2. The integrated circuit of claim 1, further comprising a processing unit configured to access the patched image in the RAM.

3. The integrated circuit of claim 1, wherein the data stored on the OTP comprises an executable program code, and wherein the patch instruction comprises a software patch to update the executable program code so as to obtain updated program code.

4. The integrated circuit of claim 3, further comprising a processing unit arranged for executing the updated executable program code stored in the patched image in the RAM.

5. The integrated circuit of claim 1, comprising a communication unit for receiving an external signal representing a patch of the data stored on the OTP; and wherein the control unit is arranged for storing subsequently received patches onto contiguous memory locations of the OTP.

6. The integrated circuit of claim 1, wherein the patch instruction comprises a patch address and a patch data block, wherein the patch address is indicative of an address within the copied image, and wherein the control unit is arranged for overwriting a portion of the copied image with the patch data block, based on the address.

7. The integrated circuit of claim 1, wherein the patch instruction comprises a patch address, an indication of a word size, and a word value in accordance with the word size, wherein the patch address is indicative of an address within the copied image, and wherein the control unit is arranged for overwriting a word of the copied image with the word value based on the patch address, wherein the word of the copied image has a size corresponding to the word size of the patch instruction.

8. A one-time programmable memory (OTP) comprising:
    data comprising an application code or an application data; and at least one patch instruction stored in a predetermined second address range outside an predetermined first address range of the OTP comprising the data, wherein the patch instruction comprises a patch address and a patch data block, wherein the patch address is indicative of an address within the address range of the OTP comprising the data, and wherein the patch data block is indicative of data that replaces a portion of the data comprising the application code or the application data, based on the patch address, wherein the OTP has memory addresses in an OTP address range covering addresses from a lowest QTP address to a highest OTP address, and wherein the predetermined first address range is located at one end of the OTP address range, and wherein the predetermined second address range is located at or near the other end of the OTP address range.

9. A method of patching an OTP, comprising the steps of:
providing a one-time programmable memory (OTP), a random access memory (RAM), and a processing unit;
copying data stored in a predetermined first address range of the OTP into the RAM to obtain a copied image mirroring said data;
checking for presence of a patch instruction in a predetermined second address range of the OTP, wherein the predetermined first address range is different from the predetermined second address range, wherein the patch instruction specifies a change to be made to the data, and if a patch instruction is found in the predetermined second address range of the OTP, modifying a portion of the copied image based on the patch instruction, to obtain a patched image stored in the RAM,
wherein the OTP has memory addresses in an OTP address range covering addresses from a lowest OTP address to a highest OTP address, and wherein the predetermined first address range is located at one end of the OTP address range, and wherein the predetermined second address range is located at the other end of the OTP address range.

10. The method of claim 9, wherein a computer program product comprises instructions for causing a processing unit to perform the method of claim 9.

11. The method of claim 9, wherein the data stored on the OTP comprise an executable program code.

12. The method of claim 11, wherein the processing unit may be arranged for executing the updated executable program code stored in the patched image in the RAM.

13. The method of claim 9, wherein the patch instruction comprises a patch address, an indication of a word size, and a word value in accordance with the word size wherein the patch address is indicative of an address within the copied image, and the control unit is arranged for overwriting a word of the copied image with the word value based on the patch address, wherein the word of the copied image has a size corresponding to the word size of the patch instruction.

14. A method of patching an OTP, comprising the steps of:
(1) providing a system comprising a one-time programmable memory (OTP), a random access memory (RAM), and a processing unit;
(2) start patching;
(3) copying data stored in the RAM;
(4) initializing a OTP variable header (HDR) to a highest memory address or to a predetermined value where the first patch would be stored;
(5) read the OTP address HDR;
(6) checking if each of 0th to 15th bits of this OTP HDR address equals zero and, if it is so, then end patching method, else go to step 7;
(7) applying the patch;
(8) checking if the 15th bit of the OTP HDR address, which is a patch type indicator bit, is zero and, if it is so, then a length of the block is extracted from bits 16 to 31 of the OTP HDR address and go to step (9), else go to step 11;
(9) extracting destination address from bits 0 to 14 of the OTP HDR address and a block having such a length is copied to the designated address;
(10) decreasing variable OTP HDR address by the length of the block extracted in step (8) and go to step (5);
(11) extracting length of the block from bits 0 to 11 of the OTP HDR address and align value from bits 12 to 13 of the OTP HDR address;
(12) checking if align value is 1 and, if it is so, then an 8 bit alignment has to be performed, else, if align value is 2, then a 16 bit alignment is to be performed, else, if align value is 3, then a 32 bits alignment is to be performed, wherein in the alignment steps a target address and data to be copied are determined;
(13) copying the data to the address determined in step (12);
(14) checking if all patches of the patch instruction have been processed and, if it is so, then go to step (10), else go to step (12) to process a next patch.

15. The method of claim 14, wherein the process start is triggered by a power-up of the system.

16. A system to patch wireless a one-time programmable (OTP) memory comprising:
a radio device receiving patch data packets from a master station;
an exchange memory wherein the patch data packets received are stored into;
a processing unit configured to parse every patch data packet received and, as soon a Patch Download Instruction is detected, next N patch data packets received are stored into a non-volatile memory after being buffered in the exchange memory, wherein N denotes a total number of payload packets received,
wherein after counting N packets, at application level, the processing unit parses every packet's payload and identifies a Patch Tail Instruction (PTI), and wherein upon the identification of the PTI, the patch reception is terminated;
said non-volatile memory (NVMem) comprising an application, which has been mirrored from a one-time programmable (OTP) memory; and
said one-time programmable (OTP) where original data are stored.

17. The system of claim 16, wherein the radio device comprises a Bluetooth Low Energy module.

18. The system of claim 16, wherein the exchange memory is a SRAM memory.

19. The system of claim 16, wherein the application in the NVMem, mirrored from the OTP, first checks a NVMem header and proceeds then with actual execution.

20. The system of claim 19, wherein the processing unit calls for a patch function with offset of the address of at patch, if the NCMem header has a nonzero entry.

21. The system of claim 16 wherein the processing unit is a CPU.

22. The system of claim 16 wherein the NVMem is a E2PROM memory or a FLASH memory or an on-chip retention RAM.

* * * * *